US008734254B2

United States Patent
Aguilar, Jr. et al.

(10) Patent No.: US 8,734,254 B2
(45) Date of Patent: May 27, 2014

(54) VIRTUAL WORLD EVENT NOTIFICATIONS FROM WITHIN A PERSISTENT WORLD GAME

(75) Inventors: Maximino Aguilar, Jr., Georgetown, TX (US); Charles R. Johns, Austin, TX (US); Mark R. Nutter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/380,021

(22) Filed: Apr. 25, 2006

(65) Prior Publication Data

US 2007/0265091 A1    Nov. 15, 2007

(51) Int. Cl.
 A63F 9/24      (2006.01)
 A63F 13/00     (2014.01)
 G06F 17/00     (2006.01)
 G06F 19/00     (2011.01)
 A63F 13/12     (2006.01)

(52) U.S. Cl.
 CPC ......... *A63F 13/12* (2013.01); *A63F 2300/5533* (2013.01); *A63F 2300/5553* (2013.01); *A63F 2300/407* (2013.01); *A63F 2300/5593* (2013.01)
 USPC ................................. 463/42; 463/40; 463/43

(58) Field of Classification Search
 CPC . A63F 13/12; A63F 13/10; A63F 2300/5533; A63F 2300/807; A63F 13/00; A63F 2300/407; A63F 13/06; A63F 2300/609; A63F 2300/535; A63F 2300/5553; A63F 2300/558; A63F 2300/5593; A63F 2300/575
 USPC .......................................................... 463/42
 See application file for complete search history.

(56) References Cited

U.S. PATENT DOCUMENTS

| 5,830,067 A | 11/1998 | Graves et al. |
| 6,763,384 B1 | 7/2004 | Gupta et al. |
| 6,773,344 B1 * | 8/2004 | Gabai et al. ...................... 463/1 |

(Continued)

FOREIGN PATENT DOCUMENTS

| CN | 1187957 C | 2/2005 |
| JP | 2003109025 A | 4/2003 |
| JP | 2003144756 A | 5/2003 |
| JP | 2004329948 A | 11/2004 |

OTHER PUBLICATIONS

U.S. Appl. No. 11/425,452, filed Jun. 21, 2006, Aguilar, Jr. et al.

(Continued)

*Primary Examiner* — Kevin Y Kim
(74) *Attorney, Agent, or Firm* — Stephen R. Tkacs; Stephen J. Walder, Jr.; Matthew B. Talpis

(57) ABSTRACT

A mechanism is provided for generating event notifications for offline characters from within a persistent world online game. A player agent for an offline player includes an event monitor that monitors for events that occur in a persistent virtual world maintained by a game server. When a game event occurs that triggers an offline player rule, the player agent composes an event notification message and sends the message to the offline player. Event notification messages may include images, voice (text-to-speech), sound, or video. Offline players may receive event notifications at various messaging clients, such as personal computers and wireless telephones. A notification server may transmit the event notifications via existing communications channels, such as electronic mail, facsimile, instant messaging, text messaging, and voice communications.

19 Claims, 6 Drawing Sheets

(56) References Cited

U.S. PATENT DOCUMENTS

| | | | |
|---|---|---|---|
| 6,816,913 | B1 | 11/2004 | Liebenow |
| 6,908,389 | B1 | 6/2005 | Puskala |
| 7,192,351 | B2 | 3/2007 | Rozkin et al. |
| 8,128,498 | B2 | 3/2012 | Aguilar, Jr. et al. |
| 2003/0177187 | A1* | 9/2003 | Levine et al. ............ 709/205 |
| 2004/0143852 | A1* | 7/2004 | Meyers ................. 725/133 |
| 2005/0004984 | A1 | 1/2005 | Simpson |
| 2005/0131837 | A1 | 6/2005 | De Sanctis et al. |
| 2005/0245317 | A1* | 11/2005 | Arthur et al. ............ 463/42 |
| 2006/0135259 | A1 | 6/2006 | Nancke-Krogh et al. |
| 2006/0135263 | A1* | 6/2006 | Labrie ................. 463/42 |
| 2006/0224681 | A1 | 10/2006 | Wurster |
| 2006/0259292 | A1 | 11/2006 | Solomon et al. |
| 2007/0077993 | A1 | 4/2007 | Midgley et al. |
| 2007/0153715 | A1 | 7/2007 | Covington et al. |
| 2008/0010635 | A1 | 1/2008 | O'Brien et al. |
| 2008/0026845 | A1 | 1/2008 | Aguilar et al. |
| 2008/0090659 | A1 | 4/2008 | Aguilar et al. |

OTHER PUBLICATIONS

U.S. Appl. No. 11/457,529, filed Jul. 14, 2006, Augilar, Jr. et al.
U.S. Appl. No. 11/548,904, filed Oct. 12, 2006, Augilar, Jr. et al.
"Networking and Communications Troubleshooting Remote Wake-up issues", Intel Corporation, http://web.archive.org/web/20050721030134/http://www.intel.com/support/network/sb/cs, 3 pages.
U.S. Appl. No. 11/425,452, 3 pages.
U.S. Appl. No. 11/457,529, 2 pages.
U.S. Appl. No. 11/548,904, 2 pages.
http://replay.waybackmachine.org/20051029222325/http://secondlife.com/badgeo/wakka.php?wakka=IISay, Oct. 29, 2005, 1 page.
http://replay.waybackmachine.org/20051101081256/http://secondlife.com/badgeo/wakka.php?wakka=Functions, Nov. 1, 2005, 4 pages.
http://replay.waybackmachine.org/20060106101647/http://secondlife.com/badgeo/wakka.php?wakka=events, Jan. 6, 2006, 2 pages.
http://replay.waybackmachine.org/20060106103511/http://secondlife.com/badgeo/wakka.php?wakka=Tutorial, Jan. 6, 2006, 3 pages.
http://replay.waybackmachine.org/20060512204222/http://secondlife.com/badgeo/wakka.php?wakka=CrashCourse9, May 12, 2006, 1 page.
http://replay.waybackmachine.org/20060520193314/http://secondlife.com/badgeo/wakka.php?wakka=LSL101Chapter1, May 20, 2006, 3 pages.
Office Action from SIPO dated Feb. 1, 2012 for Application No. 200780010579.8, 4 pages.
Berardini, Cesar A., "The Xbox 360 Dissected", http://features.teamxbox.com/xbox/1145/The-Xbox-360-Dissected/p2, May 12, 2005, 8 pages.
Lees, Jennie, "The hypervisor and its implications", http://xbox.joystiq.com/2005/11/29/the-hypervisor-and-its-implications, Nov. 29, 2005, 2 pages.
Rosenblum, Mendel et al., "Virtual Machine Monitors: Current Technology and Future Trends", IEE Computer Society, May 2005, pp. 40 and 46.

* cited by examiner

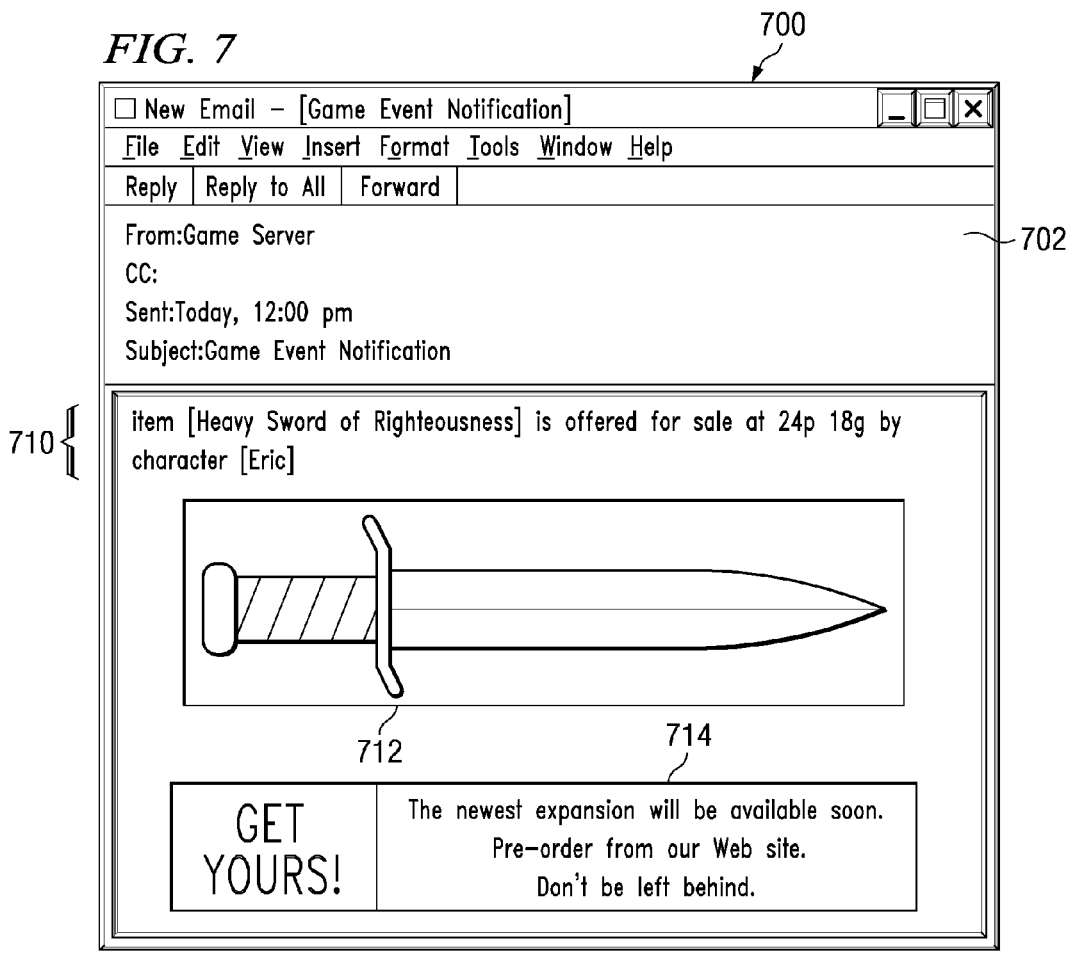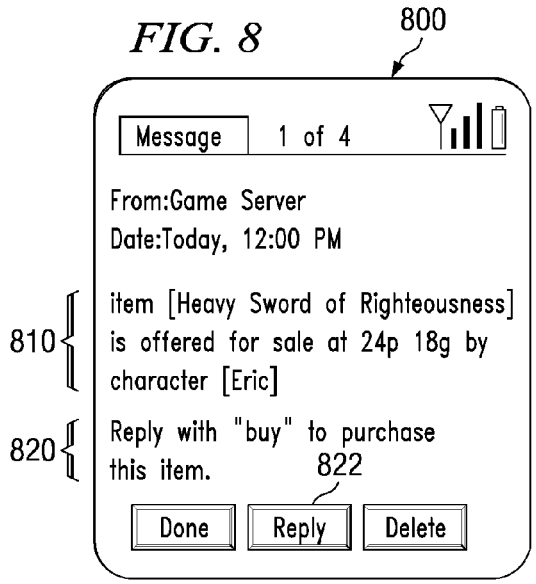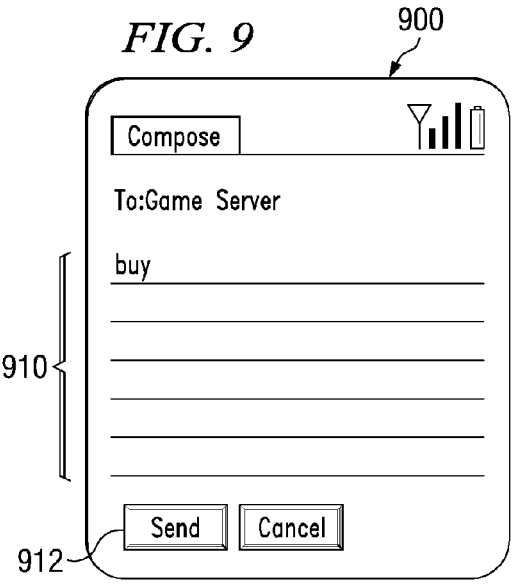

VIRTUAL WORLD EVENT NOTIFICATIONS FROM WITHIN A PERSISTENT WORLD GAME

BACKGROUND

1. Technical Field

The present application relates generally to an improved data processing system and method. More specifically, the present application is directed to a method, apparatus, and program product for generating virtual world event notifications from within a persistent world game.

2. Description of Related Art

A massively multiplayer online role playing game (MMORPG) is an online computer or console game in which a large number of players interact with one another in a virtual world. As in all role playing games (RPGs), players assume the role of a character and take control over most of that character's actions. The virtual world may be a fantasy setting, a science fiction universe, or the old west, for example.

The origin of multiplayer games may trace back to Dungeons & Dragons® or even tabletop war games. "Dungeons & Dragons" is a registered trademark of Wizards of the Coast in the United States, other countries, or both. The beginning of massively multiplayer online role playing games may be traced back to the multi-user dungeon (MUD), which is a text-based multiplayer game that uses a command line interface. However, with the rising acceptance of person computers, as well as increased graphical capabilities of personal computers and video game consoles, massively multiplayer online role playing games have become wildly popular around the world. In fact, part of the draw of massively multiplayer online role playing games is that players from any continent may be online at any given time.

Massively multiplayer online role playing games distinguish from single-player or small multi-player role playing games by the game's persistent world. The persistent world is hosted by a server and continues to exist and evolve even when a given player is not logged in. Persistent worlds may also include non-player characters (NPCs), marketplaces, auction houses, buildings, animals, vehicles, etc. This results in a game world that is far more dynamic, diverse, realistic, and addictive than those of other games.

Players of persistent world games tend to invest a great deal of time in their online characters, in some cases to the detriment of their real-life counterparts. The player is considered online when the player is logged into the game server through a game client. A typical player performs tasks, such as completing quests, practicing skills or crafts, obtaining items, or selling items, to improve the attributes or status of the character. Often, players become obsessed with the virtual world, not wanting to miss particular events or to allow other players to surpass them in ability or wealth.

SUMMARY

The exemplary embodiments recognize the disadvantages of the prior art and provide a method, apparatus, and program product for generating virtual world event notifications from within a persistent world game. A public game server provides a persistent world online game, such as a massively multiplayer online role playing game, to game clients. Players interact with the persistent virtual game world through the game clients, which may provide text-based or graphical user interfaces for representing the persistent virtual game world to the player. As the persistent virtual game world evolves through interaction by the players and other events, the public game server observes the interactions and may generate events. The results of the events are then recorded in a game database. Events are also broadcast to game clients associated with online players affected by the events.

Player agents use offline player rules to monitor for events that are relevant to particular offline players. Each player agent may execute on behalf of an offline player. Player agents may execute in game clients, the public game server, a notification server, or combinations thereof. The offline players configure offline player rules to define what types of events are relevant, as well as how, when, and/or where event notifications are to be distributed. A player agent monitors events observed by and generated by the public game server. If an event occurs that satisfies one of the set of offline player rules, the player agent generates an event notification message.

A notification server delivers event notification messages to messaging clients associated with offline players. Event notification messages may include, without limitation, electronic mail messages, instant messages, voice mail messages, facsimile transmissions, or wireless phone messages. Messaging clients may be any client devices capable of receiving event notification messages, such as personal computers, telephone devices, personal digital assistants, push email client devices, set-top television devices, or video game consoles.

In one illustrative embodiment, a method for generating event notifications from within a persistent world game comprises activating a player agent for an offline player. The player agent has an associated set of offline player rules. The player agent monitors events maintained by a game server. The game server observes and generates game events for a persistent virtual world. Responsive to a given event triggering one or more of the set of offline player rules, the player agent generates a notification event message and sends the notification event message to a messaging client associated with the offline player. Generating a notification event message comprises composing a text message and obtaining an image, sound, or video associated with the given event from a game client device associated with an online player.

In one exemplary embodiment, the player agent executes within the game server. In another exemplary embodiment, the player agent executes at a game client device associated with the offline player when the player is not logged into a game client application at the game client device.

In an exemplary embodiment, generating a notification event message comprises composing a text message using a template associated with the given event. In another exemplary embodiment, generating a notification event message further may comprise converting the text message to voice to form the notification event message.

In another exemplary embodiment, generating a notification event message further comprises composing a text message and obtaining an image, sound, or video associated with the given event. The player agent then adds the image, sound, or video to the text message to form the notification event message. In a further exemplary embodiment, obtaining an image, sound, or video associated with the given event may comprise receiving a screen capture from a game client device associated with an online player. In another exemplary embodiment, obtaining an image, sound, or video associated with the given event may comprise receiving a voice recording from a game client device associated with an online player. In yet another exemplary embodiment, obtaining an image, sound, or video associated with the given event may comprise receiving a series of screen captures from a game client device associated with an online player.

In a further exemplary embodiment, the messaging client associated with the offline player may be a personal computer, a wireless telephone device, a personal digital assistant, a push email client device, a set-top television device, or a video game console.

In another illustrative embodiment, an apparatus for generating event notifications from within a persistent world game is provided. The apparatus may comprise a game server that observes and generates game events for a persistent virtual world, a notification server that sends event notification messages to messaging clients associated with offline players, and a player agent that has an associated set of offline player rules. The player agent monitors events maintained by the game server. Responsive to a given event triggering one or more of the set of offline player rules, the player agent may generate a notification event message and send the notification event message to the notification server. The notification server may send the notification event message to a messaging client associated with the offline player. Generating a notification event message comprises composing a text message and obtaining an image, sound, or video associated with the given event from a game client device associated with an online player.

In other exemplary embodiments, the apparatus performs various ones of the operations outlined above with regard to the method in the illustrative embodiments.

In another illustrative embodiment, a computer program product comprising a computer useable medium having a computer readable program is provided. The computer readable program, when executed on a computing device, may cause the computing device to monitor, by a player agent, events maintained by a game server. The game server observes and generates game events for a persistent virtual world. The computer readable program may further cause the computing device, responsive to a given event triggering one or more of the set of offline player rules, to generate a notification event message and send the notification event message to a messaging client associated with the offline player. Generating a notification event message comprises composing a text message and obtaining an image, sound, or video associated with the given event from a game client device associated with an online player.

In other exemplary embodiments, the computer readable program may cause the computing device to perform various ones of the operations outlined above with regard to the method in the illustrative embodiments.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a notification event message presented as an electronic mail message in accordance with an exemplary embodiment;

FIG. 8 depicts a notification event message with reply instructions presented on a wireless phone display in accordance with an exemplary embodiment;

FIG. 9 depicts a reply message for performing an offline action on a wireless phone display in accordance with an exemplary embodiment;

DETAILED DESCRIPTION OF THE ILLUSTRATIVE EMBODIMENTS

Figure 1:
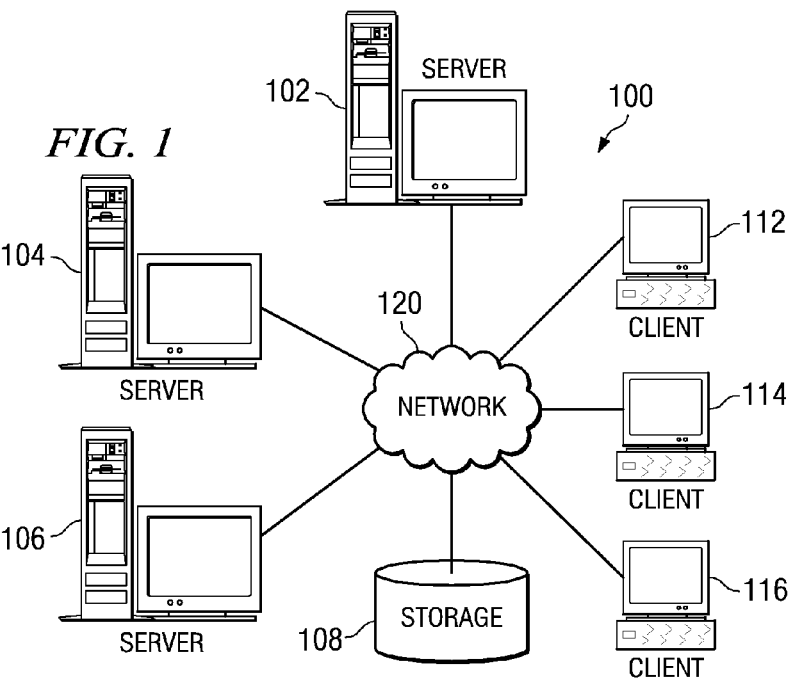
FIG. 1 depicts a pictorial representation of an exemplary distributed data processing system in which aspects of the illustrative embodiments may be implemented.
Figure 2:
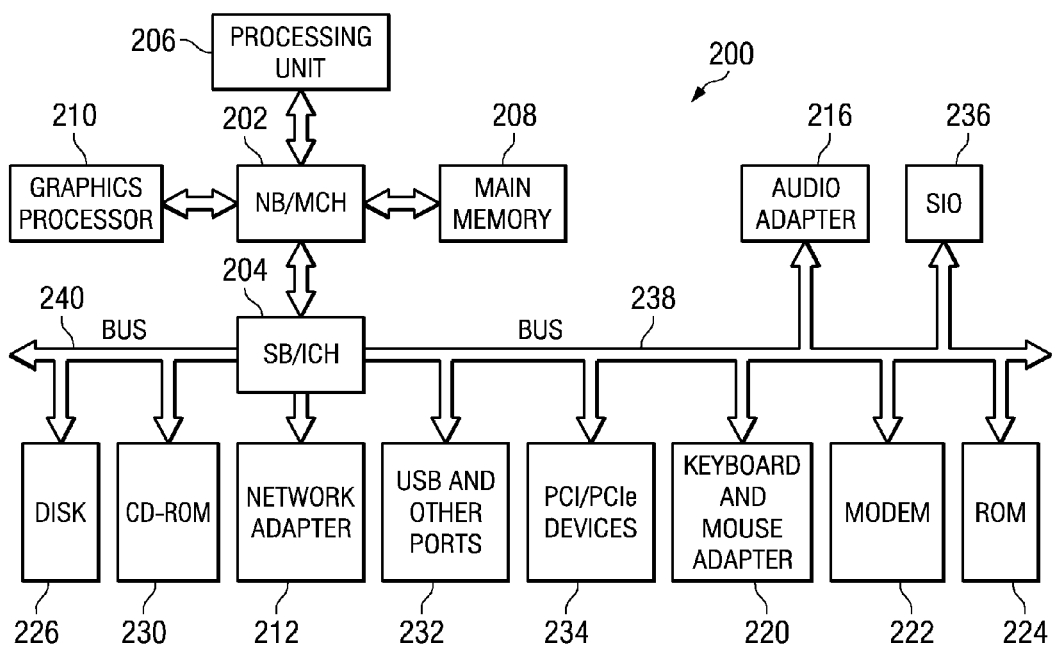
FIG. 2 is a block diagram of an exemplary data processing system in which aspects of the illustrative embodiments may be implemented.

The illustrative embodiments described hereafter provide a mechanism for generating virtual world event notifications from within a persistent world game. As such, the illustrative embodiments may be implemented in a distributed data processing environment in which multiple computing devices are utilized along with one or more data networks. Accordingly, FIGS. 1 and 2 hereafter are provided as examples of a distributed data processing environment and computing devices in which exemplary aspects of the illustrative embodiments may be implemented. FIGS. 1 and 2 are only exemplary and are not intended to state or imply any limitation with regard to the types and/or configurations of computing devices in which the illustrative embodiments may be implemented. Many modifications to the computing devices and environments depicted in FIGS. 1 and 2 may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 120, which is the medium used to provide communication links between various devices and computers connected together within distributed data processing system 100. The network 120 may include connections, such as wire, wireless communication links, or fiber optic cables.

In the depicted example, servers 102, 104, and 106 are connected to network 120 along with storage unit 108. In addition, clients 112, 114, and 116 are also connected to network 120. These clients 112, 114, and 116 may be, for example, personal computers, network computers, or the like. In the depicted example, server 102 may provide data, such as boot files, operating system images, and applications to the clients 112, 114, and 116. In this instance, clients 112, 114, and 116 are clients to server 102 in the depicted example. Distributed data processing system 100 may include additional servers, clients, and other devices not shown.

More particularly, distributed data processing system 100 may provide a massively multiplayer online game environment. Server 102 may provide a game server for maintaining a persistent virtual world for clients 112, 114, 116. A persistent virtual world is a representation of an environment with which players interact. The virtual world is persistent because the environment continues to exist and evolve even when a given player is not logged in. Server 102 may run game server software and maintain a database in storage 108 to track the states of objects, structures, and characters in the persistent virtual world.

Clients 112, 114, 116 may run game client software that a player uses to interact with the persistent virtual world. Clients 112, 114, 116 may render a two-dimensional or three-dimensional representation of the persistent virtual world, although clients 112, 114, 116 may also represent the virtual world using text, as in earlier multi-user dungeons (MUDs). The player typically interacts with the virtual world on behalf of, or from the perspective of, the player's character. In three-dimensional game environments, the player's character is represented by a three-dimensional player model. A significant draw of three-dimensional multiplayer online games is the ability to customize the appearance of the player model, which is also referred to as an "avatar." The players may initially customize the appearance of the player model by selecting facial features, body style, hair color, hair style, facial hair, and the like. Throughout the game experience, the player model may evolve, just as the virtual world itself evolves. For example, the player may add armor, weapons, clothing, or companions, such as pets.

The player is considered online when the player is logged into the game server through a game client. While online, players may interact with the virtual world through commands, keystrokes, or mouse clicks. For example, a common user interface for massively multiplayer online role playing games is the WASD interface, where the virtual world is rendered from the perspective of the player's character and the "W" key moves the character forward, the "A" key turns the character left, the "S" key moves the player backward, and the "D" key moves the player right. Other user interfaces may use the cursor keys, mouse look, a top-down third-party perspective, a chase camera perspective, or other known interface techniques.

Whenever a player character interacts with the virtual world, an event is generated and sent to the game server, e.g., server 102. For instance, if a player at client 112 casts a spell on the character of the player at client 114, either a healing spell or an attack, an event is generated at client 112 and sent to server 102. Server 102 then generates an event and sends it to client 114. Server 102 also keeps track of the position, orientation, and status of each structure, character, and item. The evolution of the virtual world is the result of events. A database contains the current state of the virtual world. The events cause changes to the virtual world and, thus, the database. The role of the game client is essentially to represent these events graphically (or textually) to allow the player to monitor for events that are relevant to that player's character and to perform appropriate actions by interacting with the game client.

In one illustrative embodiment, server 104 runs a notification server. Each player may configure a player agent with a set of offline rules. The player agent may run on game server 102, notification server 104, or one of clients 112, 114, 116. The player agent monitors the events and applies the set of offline rules. If an event occurs that matches an offline rule, notification server 104 generates a message. Notification server 104 then sends the message to the offline player. The message may be, without limitation, an electronic mail message, an instant message, a voice message, or a wireless phone message.

In another exemplary embodiment, server 106 may run a Web server application, which provides Web-based user interfaces for configuring rules or reading or composing messages for notification server 104. Thus, a player may configure the set of offline rules while at work through a Web interface without the need for a heavy, graphics-intensive game client. Alternatively, a player may configure offline rules through the game client itself or a specialized client application.

While the depicted example shows the game server, the notification server, and the Web server as separate physical devices, these servers, or various combinations of these servers, may actually be server applications running on the same physical device. For example, the game server and notification server may both run on server 102 and the Web server may run on server 104. Alternatively, the notification functionality may be integrated within the game server on server 102.

In the depicted example, distributed data processing system 100 is the Internet with network 120 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 102 or client 112 in FIG. 1, in which computer usable code or instructions implementing the processes for illustrative embodiments may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, video game consoles, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
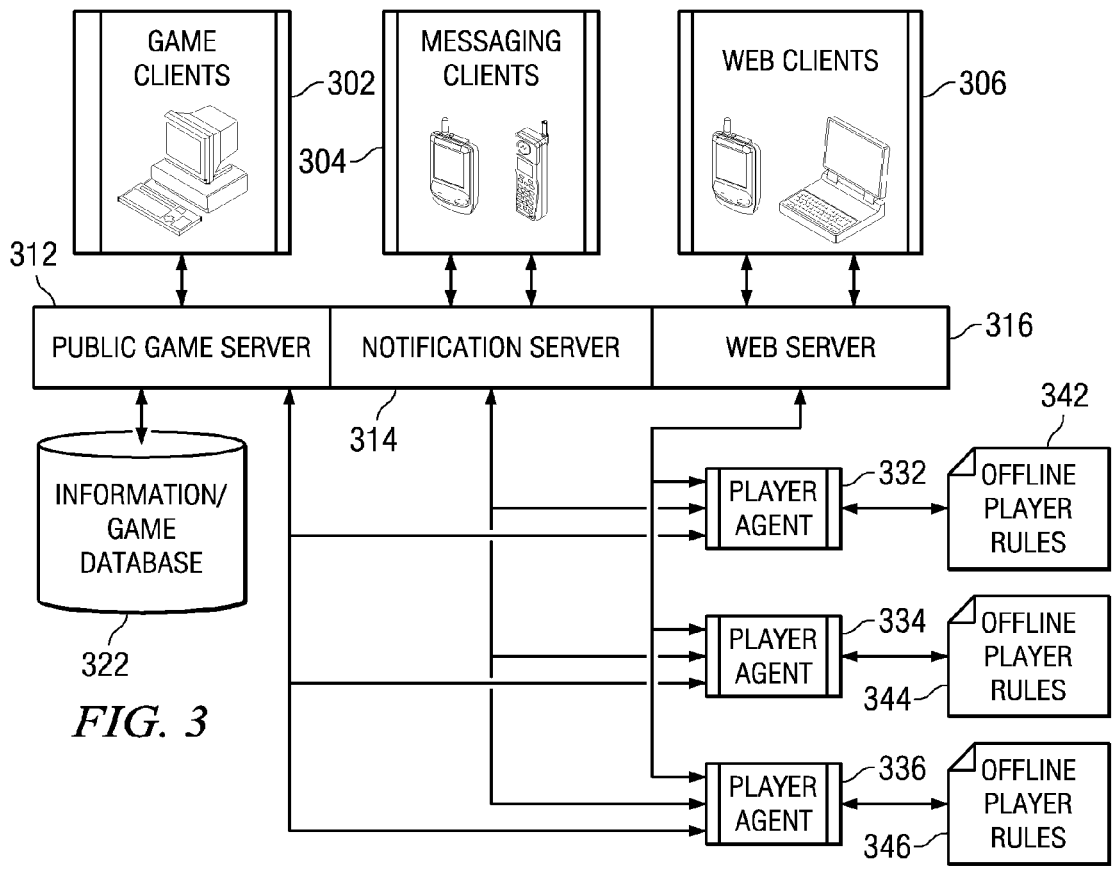
FIG. 3 is a block diagram illustrating a multiplayer online persistent world game environment in accordance with an exemplary embodiment.

FIG. 3 is a block diagram illustrating a multiplayer online persistent world game environment in accordance with an exemplary embodiment. Public game server 312 provides a massively multiplayer online game to game clients 302. Players interact with the persistent virtual game world through game clients 302, which may provide text-based or graphical user interfaces for representing the persistent virtual game world to the player. Current popular game clients represent virtual game worlds as three-dimensional environments. The persistent game world may be, for example, a medieval fantasy setting, a futuristic science fiction universe, the old west, a super hero universe, or any other environment that is suitable for a multiplayer online game.

Game clients 302 may be, for example, personal computers or video game consoles. Personal computers, as referred to herein, may include desktop computers, laptop computers, or any other computing device that is capable of running a game client application. A video game console is a specialized computing device that is used to play video games. The game software itself may be available on a compact disc (CD) or digital video disc (DVD). Earlier game machines used cartridges containing read only memory (ROM) chips. Although video game consoles may be powered by similar processor chips as desktop computers, the hardware is under the entire control of the respective manufacturer, and the software is specific to the machine's capabilities. Video game consoles may also include hand-held video game devices, which are self-contained devices with audio capabilities and displays built-in.

As the persistent virtual game world evolves through interaction by the players and other events, such as scripted actions by non-player characters (NPCs), public game server observes the interactions and may generate events. The results of the events are then recorded in information/game database 322. Events are also broadcast to all of the online players affected by the events within game clients 302. In most current implementations, the persistent virtual game world is divided into "zones." Thus, while there may be over 2,000 players online at a given time, there may only be 200 players in a particular zone. Therefore, when an event occurs in that zone, such as a player attacking a non-player merchant character, public game server 312 may broadcast the event to only the players in that zone. A person or ordinary skill in the art will recognize that the manner in which game events are distributed to online player clients is not a focus of this disclosure.

In current massively multiplayer online games, offline player presence is severely limited. At best, a player may place an item up for auction and the auction house may sell the item on behalf of the player while the player is offline. In other implementations, the player must leave his or her client device logged in to allow the character to sell an item, for instance, or to perform any other action. This causes subscribers to feel a sense of loss whenever they are offline. That is, while players are unable to have an online presence in the virtual game world, they may be missing critical events. For example, a player may return home from a long walk in the park to find out that his home city in the virtual world has been overrun by the enemy.

In accordance with an exemplary embodiment, player agents 332, 334, 336 use offline player rules 342, 344, 346 to monitor for events that are relevant to particular offline players. For example, each one of player agents 332, 334, 336 may execute on behalf of an offline player. Player agents 332, 334, 336 may execute, for example, in game clients 302, public game server 312, notification server 314, or combinations thereof. The offline players configure offline player rules 342, 344, 346 to define what types of events are relevant, as well as how, when, and/or where event notifications are to be distributed. For instance, a particular player configures player agent 332 with offline player rules 342. Player agent 332 monitors events observed by and generated by public game server 312. If an event occurs that satisfies one of the set of offline player rules 342, player agent 332 generates an event notification message. In one exemplary embodiment, if an event satisfies more than one rule, then player agent 332 may combine the resulting event notifications into a single message. Alternatively, the player agent may generate a separate event notification message for each player rule that is triggered.

Notification server 314 may deliver event notification messages to messaging clients 304. Event notification messages may include, without limitation, electronic mail messages, instant messages, voice mail messages, facsimile transmissions, or wireless phone messages. As an example, player agent 332 may compose an electronic mail message containing the event information, and notification server 314 may deliver it to one of message clients 304, through an electronic mail server, using the simple mail transfer protocol (SMTP). As another example, notification server 314 may deliver an event notification message to a group of messaging clients 304 through Internet relay chat (IRC). As yet another example, notification server 314 may deliver an event notification message to a short message service (SMS) client. A person of ordinary skill in the art will recognize that other known messaging techniques may be used.

Messaging clients 304 may be any client devices capable of receiving event notification messages. More particularly, messaging clients 304 may include, without limitation, personal computers, telephone devices, personal digital assistants, push email client devices, set-top television devices, or video game consoles. As an example, an offline player may receive a text message on his wireless telephone notifying him that his base is being attacked by the enemy. As a further example, a particular player may receive an email at work notifying her that a particular non-player character has appeared in the same zone as her character.

In one exemplary embodiment, players may configure offline player rules 342, 344, 346 using the game client applications on game clients 302. That is, the game client software may provide user interfaces for setting offline player rules. For example, a player may indicate whether event notification messages are to be sent to a particular wireless phone number, email address, or instant messaging identification. Offline player rules may also define whether notification messages shall include text, image, or voice, for example. A player may also define what types of events shall trigger event notification.

In another exemplary embodiment, web serer 316 may provide Web-based user interfaces for configuring offline player rules 342, 344, 346. Thus, players may configure offline rules while at work using Web clients 306 without the need for a graphics-intensive game client application. Web clients 306 may include, without limitation, personal computers, Web-enabled wireless phone devices, or set-top television devices.

In accordance with another illustrative embodiment, player agents 332, 334, 336 may generate events on behalf of offline players according to offline player rules 342, 344, 346. Players may configure offline player rules 342, 344, 346 with actions to be taken while the player is offline. Thus, the player's character may have a presence within the persistent virtual world even when the player is offline. If an event occurs that matches one of the offline player rules of a given character, the respective player agent may generate one or more events if the offline player rule calls for an action to be taken. The player agent then may send the one or more events to public game server 312 as if the event was generated by a game client for an online character.

In particular embodiments, an offline character may be represented in the persistent virtual game world just as a non-player character is represented. This may actually enhance the game experience, because players may provide interesting game content through the actions taken according to offline player rules. For instance, players may contribute to the persistent virtual world even while offline by providing offline player rules that offer quests to online characters. Offline players may dance for a few coins or upgrade armor for a price, for example. Alternatively, offline players may perform scripted actions to add to the overall story of the virtual world.

Alternatively, offline players may add, modify, or remove offline player rules using messaging clients 304. When a player issues a message from one of messaging clients 304, notification server 314 may forward the message to the respective player agent 332, 334, 336. In response to appropriate incoming messages, player agents 332, 334, 336 may update offline player rules 342, 344, 346.

The game provider sees an added benefit, because an active community of players will provide a virtual environment that is truly built and shaped by the players. While game providers may still provide non-player characters, quests, expansions, and the like, the game community will be fueled by the imaginations of the subscribers. As a result, the game providers may experience a reduction in the cancellation rate of account memberships.

Figure 4:
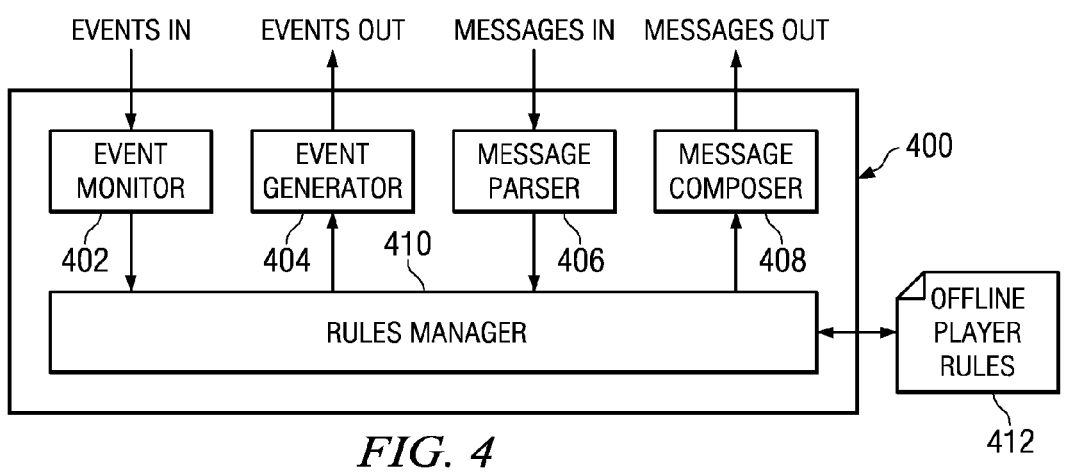
FIG. 4 is a block diagram illustrating the functional components of a player agent in accordance with an exemplary embodiment.

FIG. 4 is a block diagram illustrating the functional components of a player agent in accordance with an exemplary embodiment. Player agent 400 includes event monitor 402, event generator 404, message parser 406, message composer 408, and rules manager 410. Event monitor 402 receives events that are observed and generated by the public game server. Rules manager 410 performs a check against offline player rules 412 to determine if an incoming game event matches a rule.

If a game event received from event monitor 402 matches one of offline player rules 412, rules manager triggers message composer 408 to compose an event notification message. Message composer 408 may simply formulate a text message using a template, for example. In addition, message composer 408 may include in the message an image, such as a still image of the current state of the game or an image of an item, based on the active rule from offline player rules 412. The rules may also include a text message, sound file, or the like to send as the message. This allows the user to customize the message he receives, much like a ring tone may identify a caller. Furthermore, if indicated within the active rule, message composer 408 may perform text-to-speech conversion and output the event notification message as a sound file. Message composer 408 then provides the generated message to the notification server.

Message parser 406 receives incoming messages that may add, modify, or remove rules in offline player rules 412. Message parser 406 parses the message according to templates or a predefined syntax, for example. In response to appropriate incoming messages, rules manager 410 updates offline player rules 412 based on instructions in the message composed by the user. For example, rules manager 410 may add more detailed events, request a still image or short video, etc., based on the instructions from the offline player.

In another illustrative embodiment, rules manager 410 may signal event generator 404 to generate game events on behalf of the offline player. In response to a particular rule being activated from offline player rules 412, or in response to an appropriate incoming message, rules manager 410 may activate event generator 404 to send a game event to the public game server as if the event were generated by an online player's game client.

Figure 5:
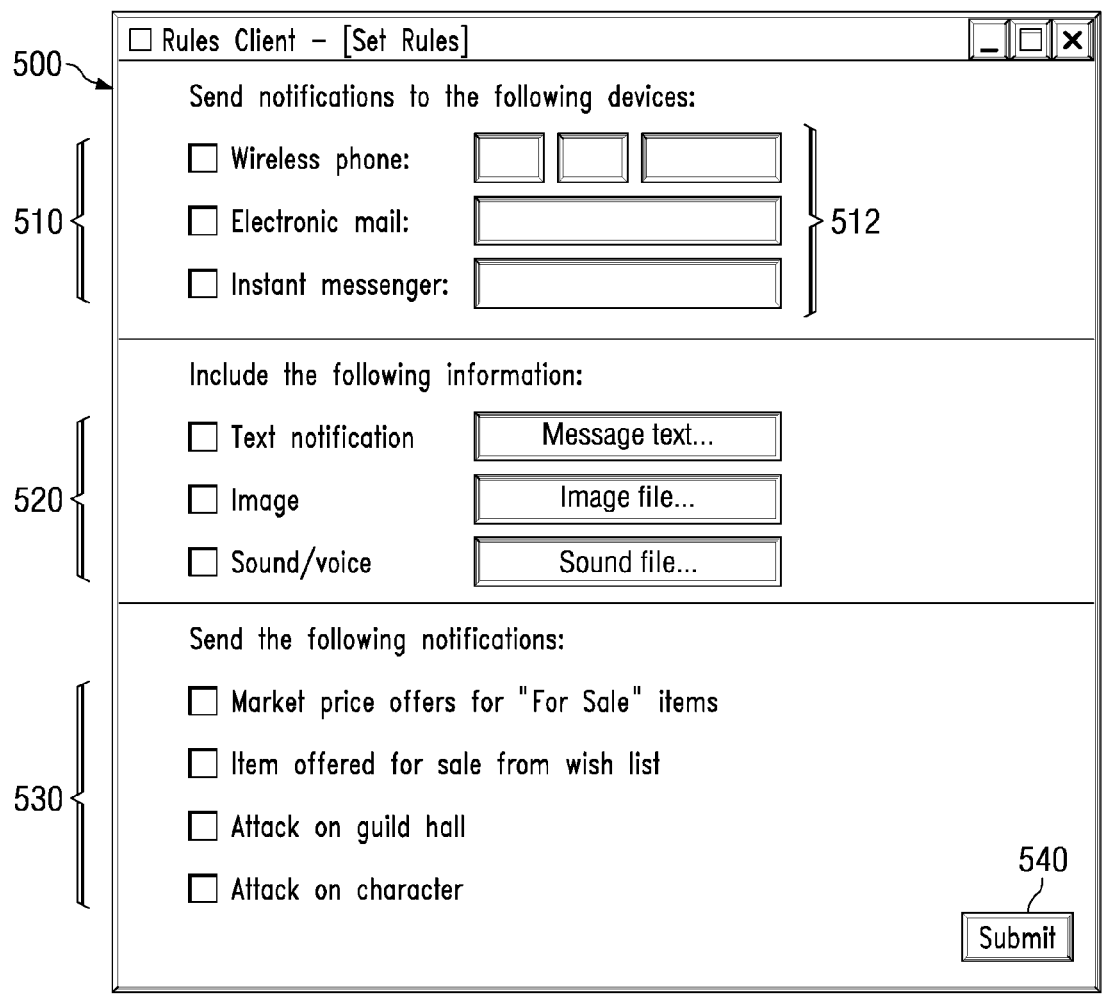
FIG. 5 depicts a rule configuration user interface in accordance with accordance with an illustrative embodiment.

FIG. 5 depicts a rule configuration user interface in accordance with an illustrative embodiment. Rules client window 500 provides an interface through which a player may configure offline player rules for event notification. Rules client window 500 may be presented through a game client application running on one of game clients 302 in FIG. 3, a Web browser running on one of Web clients 306 in FIG. 3, or a stand-alone application, for example.

Rules client window 500 includes a contact information portion 510, a message content portion 520, and a notification type portion 530. In contact information portion 510, the player may indicate whether he or she wishes to receive game event notifications by wireless phone, electronic mail, or instant messenger. The player may provide the contact information in text entry fields 512. As an example, a player may check the "Wireless phone" box and enter a telephone number in the appropriate field. Contact information portion 510 may include more or fewer options depending upon the implementation.

Message contact portion 520 allows a player to indicate whether the message should include a text notification, an image, or voice. In an exemplary implementation, the player may check all three selections. If the "Image" selection is checked, the notification service may provide an image of an item or a screen capture from a game client of a nearby online player, for example. Alternatively, the game server may be configured to generate a low resolution image, for instance. If the "Voice" selection is checked, the notification service may perform text-to-speech conversion and provide the event notification message as a voice message or voice mail.

Notification type portion 530 allows a player to indicate what types of events should result in a notification message. In the depicted example, the types of notification events include a market price offer to buy an item the player is selling, an offer to sell an item the player has on a wish list, an attack on the player's guild hall, and an attack on the player's character. Notification type portion 530 presents a small number of checkboxes for simplicity; however, a person of ordinary skill in the art will appreciate that the catalogue of possible event types may be quite extensive and will likely include many more event types and more detailed and complicated rules. In an alternative embodiment, notification type portion 530 may include a notification entry interface that allows the player to add a finite, or perhaps limitless, number of notification types using a simple programming or scripting language.

Figure 6:
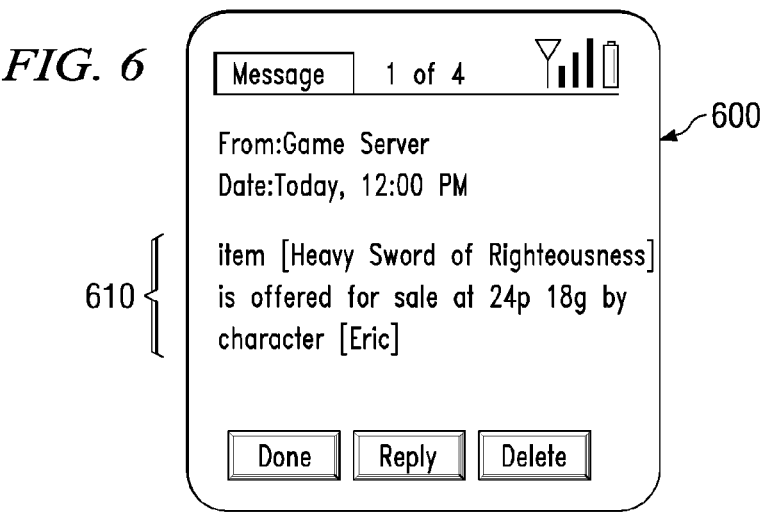
FIG. 6 depicts a notification event message presented on a wireless phone display in accordance with an exemplary embodiment.

FIG. 6 depicts a notification event message presented on a wireless phone display in accordance with an exemplary embodiment. Message display 600 may be presented on one of messaging clients 304 in FIG. 3, for example. Message display 600 includes a text message display portion, which includes event notification content 610. In the depicted example, the event notification alerts the player that a particular item is being offered for sale. The event notification also informs the player of the character offering the item for sale and the price.

FIG. 7 depicts a notification event message presented as an electronic mail message in accordance with an exemplary embodiment. Electronic mail window 700 may be presented on one of messaging clients 304 or one of Web clients 306 in FIG. 3, for example. Electronic mail window 700 includes message portion 702. Message portion 702 presents message header information and message content. The message content includes event notification content 710. In the depicted example, the message content 710 is also accompanied by image 712. In this instance, image 712 is of the item being offered for sale. In addition, in this example, the message portion also includes banner advertisement 714. The game provider may use the event notification messages as a vehicle to advertise related products or to sell advertising to partners.

In the depicted example, image 712 is of a particular item being offered for sale. However, the image may be any type of image related or unrelated to the event notification. For example, players may offer photographs to be used in character profiles. As another example, image 712 may be an illustration that is reasonably associated with the particular event.

As another example, the image may be a screen capture taken by a nearest online player to the event or the game server. For instance, if an online character offering the item for sale happens to be looking at the offline player's character when making the offer, the game server may instruct the online character's game client application to take a low resolution screen capture and send the screen capture image to the player agent composing the message. Alternatively, if the offline character's city is attacked, the image may be a screen capture from the viewpoint of the nearest online bystander, the offline player character's point of view, or even the attacker's point of view, showing the ruin left in the wake of the attack. In this manner, the event notification message may provide significant persistent world information to an offline player through standard communications channels outside the game world.

FIG. 8 depicts a notification event message with reply instructions presented on a wireless phone display in accordance with an exemplary embodiment. Message display 800 may be presented on one of messaging clients 304 in FIG. 3, for example. Message display 800 includes a text message display portion, which includes event notification content 810 and reply instructions 820. In the depicted example, the event notification alerts the player that a particular item is being offered for sale. The event notification also informs the player of the character offering the item for sale and the price.

Reply instructions 820 tell the player how to send a message into the event notification server to perform an offline action responsive to the event. In this example, the player may select "Reply" button 822 and reply to the message with the word "buy" to purchase the item.

FIG. 9 depicts a reply message for performing an offline action on a wireless phone display in accordance with an exemplary embodiment. Message composition display 900 may be presented on one of messaging clients 304 in FIG. 3, for example. Message composition display 900 includes message entry portion 910. The player may enter a message to the game server in message entry portion 910. In the depicted example, the player enters the word "buy" in response to a particular offer for sale; however, the message may comprise specific instructions for offline player actions or rules. In particular, the player may use templates or a specific syntax for composing messages. When message composition is complete, the player may select "Send" button 912 to send the message to the event notification server. When the event notification server receives, the message, the event notification server may generate a game event, as discussed above.

Figure 10:
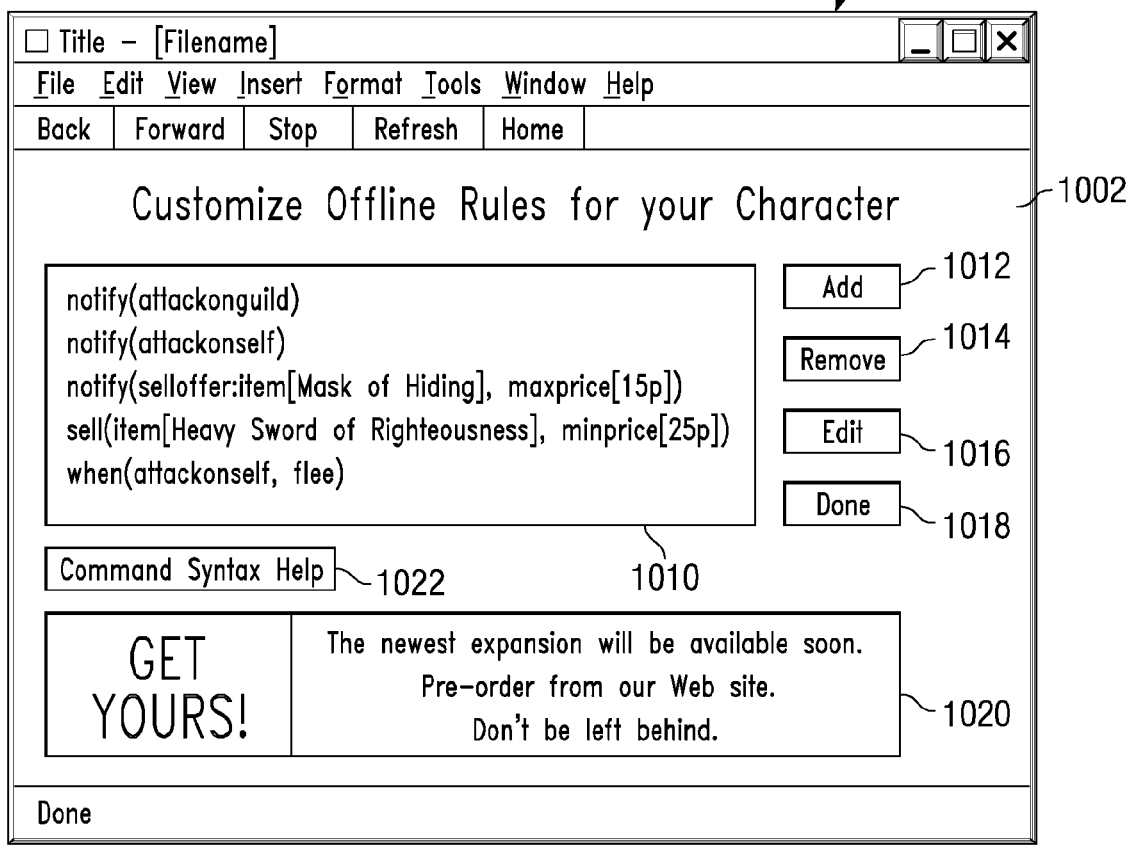
FIG. 10 depicts a Web-based offline player rule customization interface in accordance with an exemplary embodiment.

FIG. 10 depicts a Web-based offline player rule customization interface in accordance with an exemplary embodiment. The rule customization interface may be presented as a Web page in a Web browser application interface running on one of Web clients 306 in FIG. 3, for example. Web browser window 1000 includes display area 1002 in which the offline player rule customization interface may be presented.

The offline player rule customization interface includes rules list portion 1010, "Add" button 1012, "Remove" button 1014, "Edit" button 1016, and "Done" button 1018. The existing rules are listed in rules list portion 1010. Selecting "Add" button 1012 may cause the Web client to generate another interface for entering a specific offline player rule. The interface (not shown for simplicity) for entering a specific offline player rule may be, for example, a simple text entry field. However, given the number of possible rules in a typical massively multiplayer online game, the interface for entering a rule may include radio buttons, check boxes, drop-down menus, and the like.

The player may select a rule in rule list portion 1010 and select "Remove" button 1014 to remove the list from the list. Selecting a rule from rule list portion 1010 and selecting "Edit" button 1016 may generate an interface for entering rule information similar to that described above for adding a rule. When the player is finished adding, removing, and editing rules, the player may select "Done" button 1018 to persist the rules to the offline player agent, which may reside locally on the game client or may reside at the game server or event notification server, as described above.

The player may also select "Command Syntax Help" button 1022 to view a help dialog. Since the number and complexity of the commands may be more than can be remembered by a casual user, the help dialog may present a list of commands and guidelines for the syntax. The help dialog may also include other information, such as frequently asked questions, troubleshooting, etc.

In addition, display area 1002 may also present banner advertisement 1020. As stated above, the game provider may use the event notification messages as a vehicle to advertise related products or to sell advertising to partners.

Figure 11:
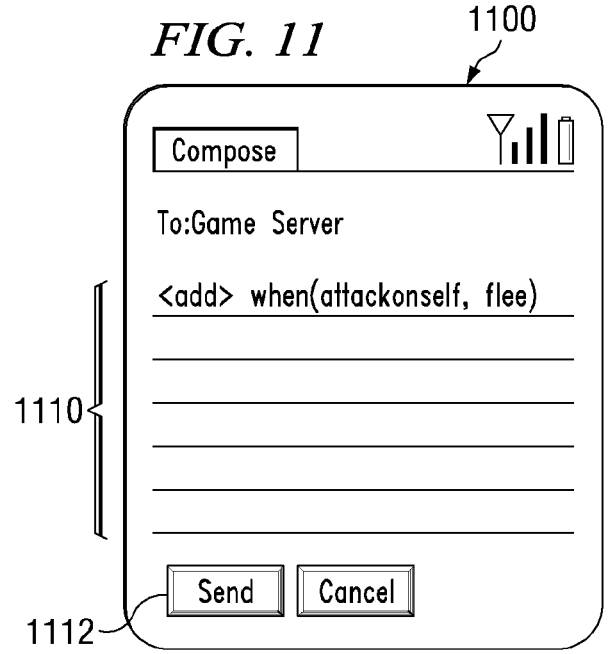
FIG. 11 depicts a message for composing an offline player rule on a wireless phone display in accordance with an exemplary embodiment.

FIG. 11 depicts a message for composing an offline player rule on a wireless phone display in accordance with an exemplary embodiment. Message composition display 1100 may be presented on one of messaging clients 304 in FIG. 3, for example. Message composition display 1100 includes message entry portion 1110. The player may enter a message to the game server in message entry portion 1110. In the depicted example, the player enters the rule "<add> when: attackonself, flee" to submit an offline player rule to be used by a player agent. In particular, the player may use templates or a specific syntax for composing messages.

The command editing commands may include "add," "delete," "change," "and "view rules" commands. Thus, the user may compose a message beginning with "<add>" followed by the command to be added, for example. Other commands are possible, such as "fleenow," "attack," and so forth, depending on the commands of the game client. Many online persistent world game clients include a command-line interface, although it is usually hidden from the user in the default interface. When message composition is complete, the player may select "Send" button 1112 to send the message to the player agent through the event notification server.

Figure 12:
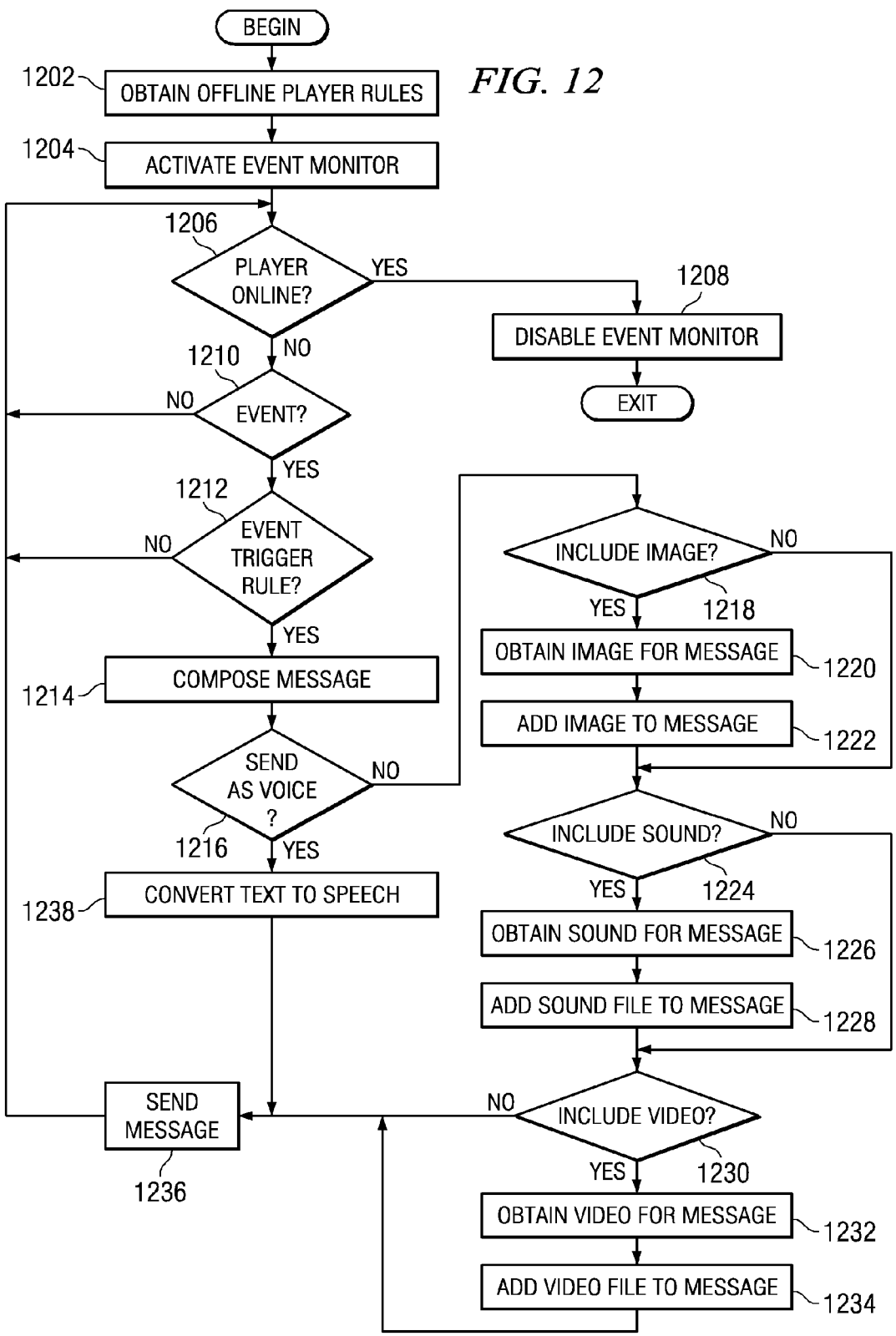
FIG. 12 is a flowchart illustrating operation of a player agent for sending event notifications to an offline player in response to game events within a persistent virtual game world in accordance with an illustrative embodiment.

FIG. 12 is a flowchart illustrating operation of a player agent for sending event notifications to an offline player in response to game events within a persistent virtual game world in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be embodied in a computer-readable memory, storage medium, or transmission medium that can direct a processor or other programmable data processing apparatus to function in a particular manner, such that the instructions stored in the computer-readable memory, storage medium, or transmission medium produce an article of manufacture including instruction means that implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

With particular reference to FIG. 12, operation begins when the player goes offline, and the player agent obtains a set of offline player rules (block 1202). The player agent activates the event monitor (block 1204). The player agent then determines whether the player is online (block 1206). The player is considered online when the player is logged into the game server through a game client. If the player is currently online, then the player agent disables the event monitor (block 1208), and operation ends.

If the player is not online—that is, the player is currently offline—then the event monitor determines whether an event is observed by or generated by the game server (block 1210). If the event monitor does not detect an event, operation returns to block 1206 to determine if the player is still offline.

If the event monitor detects an even in block 1210, the player agent determines whether the event triggers an offline player rule (block 1212). If the event does not trigger a rule, operation returns to block 1206 to determine if the player is still offline. However, if the event does trigger an offline player rule in block 1212, then the player agent composes an event notification message to send to the offline player outside of the virtual game world (block 1214).

Next, the player agent determines whether to send the message as voice (block 1216). If the player agent determines that the message is not to be sent as a voice message, the player agent determines whether to include an image (block 1218). This determination may be made by examining the offline player rules to determine whether the offline player wishes to receive images. Also, if an image is not available for the particular event notification, then the offline player agent may determine that an image is not to be included, even if the offline player prefers to receive images.

If the player agent determines that an image is to be included, then the player agent obtains an image for the message (block 1220). The player agent may obtain an image by retrieving an image associated with the event, such as an image of an item, place, or character, for instance. A pre-existing image may be a pre-rendered image from the game, concept art, a photograph, or the like. Alternatively, the player agent may obtain an image by requesting another component to generate an image specifically for the event. For example, the player agent may send a request through the game server to an appropriate online player's game client. Responsive to receiving the request, the online player's game client may take a screen capture and return it to the offline player agent. The screen capture may be modified for event notification. For example, the screen capture may exclude heads-up-display graphical elements or may have a lower display resolution than a normal game display. In an alternative embodiment, the game server may include an image capture component for generating a screen capture on behalf of the offline player. Because the game server maintains a current state of the virtual game world at all times, the game server may render a view of the game world from the perspective of the offline character or any other character.

Thereafter, the player agent adds the image to the message (block 1222) and determines whether to include a sound with the message (block 1224). If the player agent determines that an image is not to be included in the message in block 1218, operation proceeds to block 1224 to determine whether a sound is to be included. This determination may be made by examining the offline player rules to determine whether the offline player wishes to receive sounds. Also, if a sound is not available for the particular event notification, then the offline player agent may determine that a sound is not to be included, even if the offline player prefers to receive sounds.

If the player agent determines that a sound is to be included, then the player agent obtains an image for the message (block 1226). The player agent may obtain a sound by retrieving a sound file associated with the event, such as a battle sound, spoken text, or music, for example. A pre-existing sound file may be a pre-recorded sound from the game, a player-created sound, a ring tone, or the like. Alternatively, the player agent may obtain a sound by receiving the sound from another component specifically for the event. For example, an attacking player may record a taunt or other spoken message using a microphone.

Thereafter, the player agent adds the sound to the message (block 1228) and determines whether to include a video with the message (block 1230). If the player agent determines that a sound is not to be included in the message in block 1224, operation proceeds to block 1230 to determine whether a video is to be included. This determination may be made by examining the offline player rules to determine whether the offline player wishes to receive videos. Also, if a video is not available for the particular event notification, then the offline player agent may determine that a video is not to be included, even if the offline player prefers to receive videos.

If the player agent determines that a video is to be included, then the player agent obtains a video for the message (block 1232). The player agent may obtain a video by retrieving a video file associated with the event, such as a cut scene video from the game, for example. Alternatively, the player agent may obtain a video by requesting another component to generate a video specifically for the event. For example, the player agent may send a request through the game server to an appropriate online player's game client. Responsive to receiving the request, the online player's game client may take a series of screen captures, combine them to form a moving video, and return the video file to the player agent. The video may be modified for event notification. For example, the screen captures may not have heads-up-display graphical elements or may have a lower display resolution than a normal game display. In an alternative embodiment, the game server may include an image capture component for generating a series of screen captures on behalf of the offline player. Because the game server maintains a current state of the virtual game world at all times, the game server may render a view of the game world from the perspective of the offline character, or any other character, at various points in time. These screen captures may be combined to form a moving video.

Thereafter, the player agent adds the video to the message (block 1234) and sends the message (block 1236). If the player agent determines that a video is not to be included in block 1230, then the player agent sends the message as currently composed (block 1236). Then, operation returns to block 1206 to determine whether the player is now online.

Returning to block 1216, if the offline player agent determines that the event notification is to be sent as a voice message, the player agent converts the text of the message to speech (block 1238). Thereafter, operation proceeds to block 1236, where the player agent sends the message. In this case, the player agent sends the message as a phone call, a voice mail, or as an attachment to an email, for example. Then, operation returns to block 1206 to determine whether the player is now online.

Thus, the illustrative embodiments solve the disadvantages of the prior art by providing a mechanism for generating event notifications for offline characters from within a persistent world online game. A player agent for an offline player includes an event monitor that monitors for events that occur in a persistent virtual world maintained by a game server. When a game event occurs that triggers an offline player rule, the player agent composes an event notification message and sends the message to the offline player. Event notification messages may include images, voice (text-to-speech), sound, or video. Offline players may receive event notifications at various messaging clients, such as personal computers and wireless telephones. A notification server may transmit the event notifications via existing communications channels, such as electronic mail, facsimile, instant messaging, text messaging, and voice communications.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating event notifications from within a persistent world game, the method comprising:

activating a player agent for an offline player, wherein the player agent has an associated set of offline player rules;

monitoring, by the player agent, events maintained by a game server, wherein the game server observes and generates game events for a persistent virtual world, wherein an online player interacts with the persistent virtual world by operating a game client device to control a character avatar within the persistent virtual world, and wherein the game client device being operated by the online player graphically renders the persistent virtual world from a perspective of the character avatar;

responsive to a given event triggering one or more of the set of offline player rules, generating a notification event message; and sending the notification event message to a messaging client associated with the offline player, wherein generating a notification event message comprises:

composing a text message;

obtaining an image, sound, or video associated with the given event from the game client device being operated by the online player and in communication with the game server; and adding the image, sound, or video to the text message to form the notification event message;

wherein the player agent comprises a rules manager configured to perform a check against offline player rules to determine if an incoming game event matches a rule;

wherein they player agent comprises a message parser configured to receive incoming messages from a Web server that may add, modify, or remove rules in offline player rules, wherein the Web server provides a Web-based user interface for configuring offline player rules using a Web client;

wherein the player a agent comprises a message composer configured to generate the notification event message;

wherein the player agent is configured to send the notification event message to a notification server, wherein the notification server forwards the notification event message to the client associated with the offline player; and wherein the player agent comprises an event generator configured to generate game events on behalf of the offline player and send the generated game events to the game server responsive to a particular rule being activated from the offline player rules.

2. The method of claim 1, wherein generating a text message comprises:

composing the text message using a template associated with the given event.

3. The method of claim 1, wherein obtaining an image, sound, or video associated with the given event comprises:

receiving a screen capture from the game client device being operated by the online player and in communication with the game server.

4. The method of claim 1, wherein obtaining an image, sound, or video associated with the given event comprises:

receiving a voice recording from the game client device being operated by the online player and in communication with the game server.

5. The method of claim 1, wherein obtaining an image, sound, or video associated with the given event comprises:

receiving a series of screen captures combined into a moving video from the game client device being operated by the online player and in communication with the game server.

6. The method of claim 1, wherein generating a notification event message further comprises:

converting the text message to voice to form the notification event message.

7. The method of claim 1, wherein the messaging client associated with the offline player is a personal computer, a wireless telephone device, a personal digital assistant, a push email client device, a set-top television device, or a video game console.

8. The method of claim 1, wherein generating a text message comprises:

composing the text message using a template associated with the given event.

9. A data processing system for generating event notifications from within a persistent world game, the data processing system comprising:

a game server that observes and generates game events for a persistent virtual world, wherein an online player interacts with the persistent virtual world by operating a game client device to control a character avatar within the persistent virtual world, and wherein the game client device being operated by the online player graphically renders the persistent virtual world from a perspective of the character avatar;

a notification server that sends event notification messages to messaging clients associated with offline players; and a player agent that has an associated set of offline player rules, wherein the player agent executes at a game client device associated with the offline player when the player is not logged into a game client application at the game client device, wherein the player agent monitors events maintained by the game server;

wherein, responsive to a given event triggering one or more of the set of offline player rules, the player agent generates a notification event message, wherein generating a notification event message comprises:

composing a text message;

obtaining an image, sound, or video associated with the given event from the game client device being operated by the online player and in communication with the game server; and adding the image, sound, or video to the text message to form the notification event message;

wherein the player agent sends the notification event message to the notification server; and wherein the notification server sends the notification event message to a messaging client associated with the offline player;

wherein the player agent comprises a rules manager configured to perform a check against offline player rules to determine if an incoming game event matches a rule;

wherein the player agent comprises a message parser configured to receive incoming messages from a Web server that may add, modify, or remove rules in offline player rules, wherein the Web server provides a Web-based user interface for configuring offline player rules using a Web client;

wherein the player agent comprises a message composer configured to generate the notification event message;

wherein the player agent is configured to send the notification event message to a notification server, wherein the notification server forwards the notification event message to the client associated with the offline player; and wherein the player agent comprises an event generator configured to generate game events on behalf of the offline player and send the generated game events to the game server responsive to a particular rule being activated from the offline player rules.

10. The data processing system of claim 9, wherein obtaining an image, sound, or video associated with the given event comprises:

receiving a screen capture from the game client device being operated by the online player.

11. The data processing system of claim 9, wherein obtaining an image, sound, or video associated with the given event comprises:

receiving a voice recording from the game client device being operated by the online player.

12. The data processing system of claim 9, wherein obtaining an image, sound, or video associated with the given event comprises:

receiving a series of screen captures combined into a moving video from the game client device being operated by the online player and in communication with the game server.

13. The data processing system of claim 9, wherein generating a notification event message further comprises:

converting the text message to voice to form the notification event message.

14. A computer program product comprising a computer useable medium having a computer readable program, wherein the computer readable program, when executed on a computing device, causes the computing device to:

monitor, by a player agent, events maintained by a game server, wherein the game server observes and generates game events for a persistent virtual world, wherein the player agent executes at a game client device associated with the offline player when the player is not logged into a game client application at the game client device, wherein an online player interacts with the persistent virtual world by operating a game client device to control a character avatar within the persistent virtual world, and wherein the game client device being operated by the online player graphically renders the persistent virtual world from a perspective of the character avatar;

responsive to a given event triggering one or more of the set of offline player rules, generate a notification event message; and send the notification event message to a messaging client associated with the offline player, Wherein generating a notification event message comprises:

composing a text message;

obtaining, by a game client device associated with an online player, an image, sound, or video associated with the given event from the game client device being operated by the online player and in communication with the game server; and adding the image, sound, or video to the text message to form the notification event message;

wherein the player agent comprises a rules manager configured to perform a check against offline player rules to determine if an incoming game event matches a rule;

wherein the player agent comprises a message parser configured to receive incoming messages from a Web server that may add, modify, or remove rules in offline player rules, wherein the Web server provides a Web-based user interface for configuring offline player rules using a Web client;

wherein the player agent comprises a message composer configured to generate the notification event message;

wherein the player agent is configured to send the notification event message to a notification server, wherein the notification server forwards the notification event message to the client associated with the offline player; and wherein the player agent comprises an event generator configured to generate game events on behalf of the offline player and send the generated game events to the game server responsive to a particular rule being activated from the offline player rules.

15. The computer program product of claim 14, wherein generating a text message comprises:

composing the text message using a template associated with the given event.

16. The computer program product of claim 14, wherein obtaining an image, sound, or video associated with the given event comprises:

receiving a screen capture from the game client device being operated by the online player.

17. The computer program product of claim 14, wherein obtaining an image, sound, or video associated with the given event comprises:

receiving a voice recording from the game client device being operated by the online player.

18. The computer program product of claim 14, wherein obtaining an image, sound, or video associated with the given event comprises:

receiving a series of screen captures combined into a moving video from the game client device being operated by the online player and in communication with the game server.

19. The computer program product of claim 14, wherein generating a notification event message further comprises:

converting the text message to voice to form the notification event message.

* * * * *